US010743551B2

(12) United States Patent
Lundkvist et al.

(10) Patent No.: US 10,743,551 B2
(45) Date of Patent: Aug. 18, 2020

(54) DOUGH WITH A LIPOLYTIC ENZYME AND/OR XYLANASE AND A MONOOXYGENASE

(71) Applicant: Novozymes A/S, Bagsvaerd (DK)

(72) Inventors: Henrik Lundkvist, Malmo (SE); Morten Tovborg, Vaerlose (DK); Leonardo De Maria, Frederiksberg (DK); Chee-Leong Soong, Raleigh, NC (US)

(73) Assignee: Novozymes A/S, Bagsvaerd (DK)

( * ) Notice: Subject to any disclaimer, the term of this patent is extended or adjusted under 35 U.S.C. 154(b) by 55 days.

(21) Appl. No.: 15/318,893

(22) PCT Filed: Jul. 6, 2015

(86) PCT No.: PCT/EP2015/065328
§ 371 (c)(1),
(2) Date: Dec. 14, 2016

(87) PCT Pub. No.: WO2016/005315
PCT Pub. Date: Jan. 14, 2016

(65) Prior Publication Data
US 2017/0188592 A1  Jul. 6, 2017

(30) Foreign Application Priority Data
Jul. 7, 2014 (EP) ..................... 14175951

(51) Int. Cl.
A21D 8/04 (2006.01)
A21D 10/00 (2006.01)

(52) U.S. Cl.
CPC .......... *A21D 8/042* (2013.01); *A21D 10/002* (2013.01)

(58) Field of Classification Search
CPC .............................. A21D 8/042; A21D 10/002
USPC ........................................................ 426/20
See application file for complete search history.

(56) References Cited

U.S. PATENT DOCUMENTS

| 6,110,508 A | 8/2000 | Oleson |
| 2006/0228446 A1 | 10/2006 | Borch et al. |
| 2007/0207521 A1 | 9/2007 | Albermann et al. |
| 2010/0074991 A1* | 3/2010 | Mutsaers ................. A21D 2/26 426/20 |
| 2012/0288585 A1 | 11/2012 | Beier |

FOREIGN PATENT DOCUMENTS

| WO | 2010059413 A2 | 5/2010 |
| WO | 2014/202616 A2 | 12/2014 |
| WO | 1995023515 A1 | 12/2014 |

OTHER PUBLICATIONS

SEQ ID No. 6-AYC34693 (Year: 2010).*
Leggio et al, 2015, Nature Commu 6, 5961, pp. 1-9.

* cited by examiner

*Primary Examiner* — Hamid R Badr
(74) *Attorney, Agent, or Firm* — Kelly Reynolds

(57) ABSTRACT

A method for preparing a dough or a baked product prepared from the dough which method comprises incorporating into the dough a lipolytic enzyme and/or a xylanase and an X143 polypeptide, wherein the X143 polypeptide is a monooxygenase.

16 Claims, No Drawings
Specification includes a Sequence Listing.

DOUGH WITH A LIPOLYTIC ENZYME AND/OR XYLANASE AND A MONOOXYGENASE

CROSS-REFERENCE TO RELATED APPLICATIONS

This application is a 35 U.S.C. 371 national application of PCT/EP2015/065328 filed Jul. 6, 2015 which claims priority or the benefit under 35 U.S.C. 119 of International application no. EP 14175951.4 filed Jul. 7, 2014, the contents of which are fully incorporated herein by reference.

REFERENCE TO A SEQUENCE LISTING

This application contains a Sequence Listing in computer readable form, which is incorporated herein by reference.

BACKGROUND OF THE INVENTION

Field of the Invention

The present invention relates to the making of baked products, more particularly making of baked products using a lipolytic enzyme and/or a xylanase and an X143 polypeptide, wherein the X143 polypeptide is a monooxygenase.

Description of the Related Art

Lipolytic enzymes and/or xylanases have been used in the baking industry for many years.

Lipolytic enzymes are used for improving the texture, and increasing the volume of the baked product. Xylanases are used for increasing the volume of the baked product and improving dough quality, e.g., by maximizing the gluten performance.

Unfortunately, as is well-known in the art of baking, the use of lipolytic enzymes and/or xylanases may result in sticky dough which is problematic to handle.

In WO2010/059413 a polypeptide isolated from *Aspergillus nidulans*, termed X143, was shown to have a boosting effect on starch saccharification when used in combination with amylolytic enzymes such as alpha-amylases and glucoamylases.

The terminology for X143 has recently been updated as an Auxiliary Activity Family 13 (AA13) by CAZY. AA13 proteins are described as copper-dependent lytic polysaccharide monooxygenases. The structure and boosting activity of AA13 proteins are described in Nature Communications 6; article number: 5961; published 22 Jan. 2015.

SUMMARY OF THE INVENTION

The inventors have found that the addition to the dough of a lipolytic enzyme and/or a xylanase together with an X143 polypeptide has a surprising effect on the stickiness of the dough without having a negative effect on the volume.

Accordingly, the invention provides in a first aspect a method for preparing dough or a baked product prepared from the dough which method comprises incorporating into the dough a lipolytic enzyme and/or a xylanase and an X143 polypeptide; in particular the invention provides a method for preparing dough or a baked product prepared from the dough which method comprises incorporating into the dough a lipolytic enzyme and/or a xylanase and an X143 polypeptide, wherein the X143 polypeptide is a monooxygenase.

In one embodiment, the lipolytic enzyme is a lipase, a phospholipase and/or a galactolipase.

In one embodiment, the X 143 polypeptide has at least 80% sequence identity to the mature polypeptide of SEQ ID NO: 1, wherein the mature protein is amino acids 19 to 248 of SEQ ID NO:1.

In one embodiment, the X 143 polypeptide is the mature polypeptide of SEQ ID NO: 1, wherein the mature protein is amino acids 19 to 248 of SEQ ID NO:1.

In one embodiment, the invention further comprises adding to the dough an enzyme selected from the group consisting of amylase, glucanase, galactanase, mannanase, aminopeptidase, alpha-amylase, beta-amylase, anti-staling alpha-amylase, carboxypeptidase, catalase, chitinase, cutinase, cyclodextrin glycosyltransferase, deoxyribonuclease, esterase, alpha-galactosidase, beta-galactosidase, glucoamylase, alpha-glucosidase, beta-glucosidase, haloperoxidase, invertase, laccase, mannosidase, oxidase, pectinolytic enzymes, peptidoglutaminase, protease, peroxidase, phytase, and polyphenoloxidase.

In one embodiment, the lipolytic enzyme is applied in an amount of 0.01-100 mg enzyme protein per kg flour.

In one embodiment, the xylanase is applied in an amount of 0.01-100 mg enzyme protein per kg flour.

In one embodiment, the X 143 polypeptide is applied in an amount of 0.01-100 mg polypeptide per kg flour.

In one embodiment, the stickiness of the dough is reduced compared to a dough without the X 143 polypeptide.

In one embodiment, the invention provides a baking composition comprising a lipolytic enzyme and/or a xylanase and an X143 polypeptide, wherein the X143 polypeptide is a monooxygenase.

In one embodiment, the baking composition further comprises an enzyme selected from the group consisting of amylase, glucanase, galactanase, mannanase, aminopeptidase, alpha-amylase, beta-amylase, anti-staling alpha-amylase, carboxypeptidase, catalase, chitinase, cutinase, cyclodextrin glycosyltransferase, deoxyribonuclease, esterase, alpha-galactosidase, beta-galactosidase, glucoamylase, alpha-glucosidase, beta-glucosidase, haloperoxidase, invertase, laccase, mannosidase, oxidase, pectinolytic enzymes, peptidoglutaminase, protease, peroxidase, phytase, and polyphenoloxidase.

In one embodiment, the invention provides a pre-mix comprising the baking composition according to the invention, flour, and one or more dough or bread additives.

In one embodiment, the invention provides dough comprising flour, water and an effective amount of a baking composition or a pre-mix according to the invention.

In one embodiment, the invention deals with use of the baking composition, the pre-mix, or the dough according to the invention to prepare a baked product.

In one embodiment, the invention provides a baked product obtained by baking the dough according to the invention.

Definitions

Lipolytic enzyme: The term "lipolytic enzyme" encompasses enzymes having lipase, phospholipase and/or galactolipase activity (glyceroglycolipid lipase) activity. The term "lipolytic enzyme" is used interchangeably with the term "polypeptides having lipolytic activity".

Lipase activity: Triacylglycerol lipase activity (EC 3.1.1.3), i.e., hydrolytic activity for carboxylic ester bonds in triglycerides, e.g., olive oil and tributyrin.

Phospholipase activity: Phospholipase activity (A1 or A2, EC 3.1.1.32 or 3.1.1.4), i.e., hydrolytic activity towards one or both carboxylic ester bonds in phospholipids such as lecithin.

Galactolipase activity: Galactolipase activity (EC 3.1.1.26), i.e., hydrolytic activity on carboxylic ester bonds in galactolipids such as DGDG (digalactosyl diglyceride).

Coding sequence: The term "coding sequence" means a polynucleotide, which directly specifies the amino acid sequence of a polypeptide. The boundaries of the coding sequence are generally determined by an open reading frame, which begins with a start codon such as ATG, GTG, or TTG and ends with a stop codon such as TAA, TAG, or TGA. The coding sequence may be a genomic DNA, cDNA, synthetic DNA, or a combination thereof.

Fragment: The term "fragment" means a polypeptide having one or more (e.g. several) amino acids absent from the amino and/or carboxyl terminus of a mature polypeptide or domain.

Host cell: The term "host cell" means any cell type that is susceptible to transformation, transfection, transduction, or the like with a nucleic acid construct or expression vector comprising a polynucleotide of the present invention. The term "host cell" encompasses any progeny of a parent cell that is not identical to the parent cell due to mutations that occur during replication.

Isolated: The term "isolated" means a substance in a form or environment that does not occur in nature. Non-limiting examples of isolated substances include (1) any non-naturally occurring substance, (2) any substance including, but not limited to, any enzyme, variant, nucleic acid, protein, peptide or cofactor, that is at least partially removed from one or more or all of the naturally occurring constituents with which it is associated in nature; (3) any substance modified by the hand of man relative to that substance found in nature; or (4) any substance modified by increasing the amount of the substance relative to other components with which it is naturally associated (e.g. multiple copies of a gene encoding the substance; use of a stronger promoter than the promoter naturally associated with the gene encoding the substance). An isolated substance may be present in a fermentation broth sample.

Mature polypeptide: The term "mature polypeptide" means a polypeptide in its final form following translation and any post-translational modifications, such as N-terminal processing, C-terminal truncation, glycosylation, phosphorylation, etc. In one aspect, the mature polypeptide is amino acids 19 to 248 of SEQ ID NO: 1. Amino acids 1 to 18 of SEQ ID NO: 1 are a signal peptide.

Mature polypeptide coding sequence: The term "mature polypeptide coding sequence" means a polynucleotide that encodes a mature X143 polypeptide having a boosting effect on starch saccharification when used in combination with amylolytic enzymes such as alpha-amylases and glucoamylases.

Sequence identity: The relatedness between two amino acid sequences or between two nucleotide sequences is described by the parameter "sequence identity". For purposes of the present invention, the sequence identity between two amino acid sequences is determined using the Needleman-Wunsch algorithm (Needleman and Wunsch, 1970, J. Mol. Biol. 48: 443-453) as implemented in the Needle program of the EMBOSS package (EMBOSS: The European Molecular Biology Open Software Suite, Rice et al., 2000, Trends Genet. 16: 276-277), preferably version 5.0.0 or later. The parameters used are gap open penalty of 10, gap extension penalty of 0.5, and the EBLOSUM62 (EMBOSS version of BLOSUM62) substitution matrix. The output of Needle labeled "longest identity" (obtained using the—nobrief option) is used as the percent identity and is calculated as follows:

(Identical Residues×100)/(Length of Alignment−Total Number of Gaps in Alignment)

For purposes of the present invention, the sequence identity between two deoxyribonucleotide sequences is determined using the Needleman-Wunsch algorithm (Needleman and Wunsch, 1970, supra) as implemented in the Needle program of the EMBOSS package (EMBOSS: The European Molecular Biology Open Software Suite, Rice et al., 2000, supra), preferably version 5.0.0 or later. The parameters used are gap open penalty of 10, gap extension penalty of 0.5, and the EDNAFULL (EMBOSS version of NCBI NUC4.4) substitution matrix. The output of Needle labeled "longest identity" (obtained using the—nobrief option) is used as the percent identity and is calculated as follows:

(Identical Deoxyribonucleotides×100)/(Length of Alignment−Total Number of Gaps in Alignment).

Improved property: When incorporated into a dough in effective amounts, the lipolytic enzyme and/or the xylanase and the X143 polypeptide, one or more properties of the dough or of the baked product obtained therefrom may be improved relative to a dough or a baked product in which the lipolytic enzyme and/or xylanase and X 143 are not incorporated.

The term "improved property" is defined herein as any property of a dough and/or a product obtained from the dough, particularly a baked product, which is improved by the action of the lipolytic enzyme and/or the xylanase and the X143 polypeptide according to the invention relative to a dough or a product in which the lipolytic enzyme and/or the xylanase and the X143 polypeptide according to the invention is not incorporated.

The improved property may include, but is not limited to, increased strength of the dough, increased elasticity of the dough, increased stability, reduced stickiness of the dough, improved extensibility of the dough, improved machineability of the dough, increased volume of the baked product, improved flavor of the baked product, improved crumb structure of the baked product, improved crumb softness of the baked product, and/or improved anti-staling of the baked product.

The improved property may be determined by comparison of a dough and/or a baked product prepared with and without addition of the lipolytic enzyme and/or the xylanase and the X143 polypeptide in accordance with the methods of the present invention which are described below.

Organoleptic qualities may be evaluated using procedures well established in the baking industry, and may include, for example, the use of a panel of trained taste-testers.

Increased strength: The term "increased strength of the dough" is defined herein as the property of dough that has generally more elastic properties and/or requires more work input to mould and shape.

Increased elasticity: The term "increased elasticity of the dough" is defined herein as the property of dough which has a higher tendency to regain its original shape after being subjected to a certain physical strain.

Increased stability of the dough: The term "increased stability of the dough" is defined herein as the property of dough that is less susceptible to mechanical abuse thus better maintaining its shape and volume and is evaluated by the ratio of height:width of a cross section of a loaf after normal and/or extended proof.

Reduced stickiness of the dough: The term "reduced stickiness of the dough" is defined herein as the property of a dough that has less tendency to adhere to surfaces, e.g., in the dough production machinery, and is either evaluated empirically by the skilled test baker or measured by the use of a texture analyzer (e.g. TAXT2) as known in the art.

Improved extensibility: The term "improved extensibility of the dough" is defined herein as the property of dough that can be subjected to increased strain or stretching without rupture.

Improved machineability: The term "improved machineability of the dough" is defined herein as the property of a dough that is generally less sticky and/or more firm and/or more elastic.

Increased volume of the baked product: The term "increased volume of the baked product" is measured as the volume of a given loaf of bread. The volume may be determined by the rape seed displacement method.

Improved crumb structure of the baked product: The term "improved crumb structure of the baked product" is defined herein as the property of a baked product with finer cells and/or thinner cell walls in the crumb and/or more uniform/homogenous distribution of cells in the crumb and is usually evaluated visually by the baker or by digital image analysis as known in the art (e.g. C-cell, Calibre Control International Ltd, Appleton, Warrington, UK).

Improved softness of the baked product: The term "improved softness of the baked product" is the opposite of "firmness" and is defined herein as the property of a baked product that is more easily compressed and is evaluated either empirically by the skilled test baker or measured by the use of a texture analyzer (e.g., TAXT2 or TA-XT Plus from Stable Micro Systems Ltd, Surrey, UK) as known in the art.

Improved anti-staling of the baked product: The term "improved anti-staling of the baked product" is defined herein as the properties of a baked product that have a reduced rate of deterioration of quality parameters, e.g., softness and/or elasticity, during storage.

DETAILED DESCRIPTION OF THE INVENTION

The invention provides a method for preparing dough or a baked product prepared from the dough which method comprises adding a lipolytic enzyme and/or a xylanase together with an X143 polypeptide. This combination has been found to have a surprising effect on the stickiness of the dough without having a negative effect on the volume.

The invention also provides baking compositions, premix, dough, and baked products comprising a lipolytic enzyme and/or a xylanase together with an X143 polypeptide.

Lipolytic Enzymes

According to the present invention a lipolytic enzyme may be a lipase, a phospholipase and/or a galactolipase. An enzyme having lipolytic activity may be obtained from microorganisms of any genus.

The lipolytic enzyme may be a fungal polypeptide. For example, the enzyme may be a yeast polypeptide such as a *Candida, Kluyveromyces, Pichia, Saccharomyces, Schizosaccharomyces*, or *Yarrowia* polypeptide; or a filamentous fungal polypeptide such as an *Acremonium, Agaricus, Alternaria, Aspergillus, Aureobasidium, Botryosphaeria, Ceriporiopsis, Chaetomidium, Chrysosporium, Claviceps, Cochliobolus, Coprinopsis, Coptotermes, Corynascus, Cryphonectria, Cryptococcus, Diplodia, Exidia, Filibasidium, Fusarium, Gibberella, Holomastigotoides, Humicola, Irpex, Lentinula, Leptospaeria, Magnaporthe, Melanocarpus, Meripilus, Mucor, Myceliophthora, Neocallimastix, Neurospora, Paecilomyces, Phanerochaete, Piromyces, Poitrasia, Pseudoplectania, Pseudotrichonympha, Rhizomucor, Schizophyllum, Scytalidium, Talaromyces, Thermoascus, Thielavia, Tolypocladium, Trichoderma, Trichophaea, Verticillium, Volvariella*, or *Xylaria* polypeptide.

In another aspect, the lipolytic enzyme is an *Acremonium cellulolyticus, Aspergillus aculeatus, Aspergillus awamori, Aspergillus foetidus, Aspergillus fumigatus, Aspergillus japonicus, Aspergillus nidulans, Aspergillus niger, Aspergillus oryzae, Aspergillus aculeatus Chrysosporium inops, Chrysosporium keratinophilum, Chrysosporium lucknowense, Chrysosporium merdarium, Chrysosporium pannicola, Chrysosporium queenslandicum, Chrysosporium tropicum, Chrysosporium zonatum, Fusarium bactridioides, Fusarium cerealis, Fusarium crookwellense, Fusarium culmorum, Fusarium graminearum, Fusarium graminum, Fusarium heterosporum, Fusarium negundi, Fusarium oxysporum, Fusarium reticulatum, Fusarium roseum, Fusarium sambucinum, Fusarium sarcochroum, Fusarium sporotrichioides, Fusarium sulphureum, Fusarium torulosum, Fusarium trichothecioides, Fusarium venenatum, Humicola grisea, Humicola insolens, Humicola lanuginosa, Irpex lacteus, Mucor miehei, Myceliophthora thermophila, Neurospora crassa, Penicillium funiculosum, Penicillium purpurogenum, Phanerochaete chrysosporium, Thielavia achromatica, Thielavia albomyces, Thielavia albopilosa, Thielavia australeinsis, Thielavia fimeti, Thielavia microspora, Thielavia ovispora, Thielavia peruviana, Thielavia setosa, Thielavia spededonium, Thielavia subthermophila, Thielavia terrestris, Trichoderma harzianum, Trichoderma koningii, Trichoderma longibrachiatum, Trichoderma reesei*, or *Trichoderma viride* polypeptide.

It will be understood that for the aforementioned species, the invention encompasses both the perfect and imperfect states, and other taxonomic equivalents, e.g., anamorphs, regardless of the species name by which they are known. Those skilled in the art will readily recognize the identity of appropriate equivalents.

Strains of these species are readily accessible to the public in a number of culture collections, such as the American Type Culture Collection (ATCC), Deutsche Sammlung von Mikroorganismen and Zellkulturen GmbH (DSMZ), Centraalbureau Voor Schimmelcultures (CBS), and Agricultural Research Service Patent Culture Collection, Northern Regional Research Center (NRRL).

The lipolytic enzyme may be identified and obtained from other sources including microorganisms isolated from nature (e.g. soil, composts, water, etc.) or DNA samples obtained directly from natural materials (e.g. soil, composts, water, etc.) using the above-mentioned probes. Techniques for isolating microorganisms and DNA directly from natural habitats are well known in the art. A polynucleotide encoding the polypeptide may then be obtained by similarly screening a genomic DNA or cDNA library of another microorganism or mixed DNA sample. Once a polynucleotide encoding a polypeptide has been detected with the probe(s), the polynucleotide can be isolated or cloned by utilizing techniques that are known to those of ordinary skill in the art.

The phospholipase may have phospholipase A1, or A2 activity; it may or may not have lipase activity. It may be of animal origin, e.g., from pancreas, snake venom or bee venom, or it may be of microbial origin, e.g. from filamentous fungi, yeast or bacteria, such as *Aspergillus* or *Fusarium*, e.g. *A. niger, A. oryzae* or *F. oxysporum*. A preferred lipase/phospholipase from *Fusarium oxysporum* is disclosed in WO 98/26057. Also, the variants described in WO 00/32758 may be used.

Suitable phospholipase compositions are LIPOPAN F™ and LIPOPAN XTRA™ (available from Novozymes NS) or PANAMORE GOLDEN™ and PANAMORE SPRING™ (available from DSM).

Xylanases

According to the present invention a xylanase may be of microbial origin, e.g., derived from a bacterium or fungus.

The xylanase may be derived from a strain of *Aspergillus*, in particular *A. aculeatus, A. niger, A. awamori*, or *A. tubigensis*. The xylanase may be derived from a strain of *Trichoderma*, e.g., *T. reesei*, or from a strain of *Humicola*, e.g., *H. insolens*.

The xylanase may be derived from *Bacillus*, e.g., *B. halodurans* or *B. subtilis*.

Suitable commercially available xylanase preparations for use in the present invention include PANZEA BG™, PENTOPAN MONO BG™, PENTOPAN 500 BG™, PENTOPAN PLUS™ Panzea Dual™, and Fungamyl Super MA™ (available from Novozymes NS), GRINDAMYL POWERBAKE™ (available from Danisco), and BAKEZYME BXP5000™ and BAKEZYME BXP 5001™ (available from DSM).

X143 Polypeptides and Polynucleotides Encoding the X143 Polypeptide

In WO2010/059413, a polypeptide isolated from *Aspergillus nidulans*, termed X143, was shown to have a boosting effect on starch saccharification when used in combination with amylolytic enzymes such as alpha-amylases and glucoamylases.

The terminology for X143 has recently been updated as an Auxiliary Activity Family 13 (AA13) by CAZY. AA13 proteins are described as monooxygenases; in particular as copper-dependent lytic polysaccharide monooxygenases. The structure and boosting activity of AA13 proteins are described in Nature Communications 6; article number: 5961; published 22 Jan. 2015.

The X143 polypeptide is an enzyme that has a better performance in the presence of 'cofactor' such as ascorbic acid or L-cysteine.

An X143 polypeptide, to be applied in the methods and compositions of the present invention, relates to isolated polypeptides comprising amino acid sequences having a degree of sequence identity to the mature polypeptide of SEQ ID NO: 1 of preferably at least 80%, e.g., at least 81%, e.g., at least 82%, e.g., at least 83%, e.g., at least 84%, e.g., at least 85%, e.g., at least 86%, e.g., at least 87%, e.g., at least 88%, e.g., at least 89%, e.g., at least 90%, e.g., at least 91%, e.g., at least 92%, e.g., at least 93%, e.g., at least 94%, e.g., at least 95%, e.g., at least 96%, e.g., at least 97%, e.g., at least 98%, e.g., at least 99%, e.g., 100%, which have a boosting effect on starch saccharification when used in combination with amylolytic enzymes such as alpha-amylases and glucoamylases.

In a preferred aspect, the X143 polypeptides according to the invention comprise amino acid sequences that differ by 1-10 amino acids, preferably by up to ten amino acids, preferably by up to nine amino acids, preferably by up to eight amino acids, preferably by up to seven amino acids, preferably by up to six amino acids, preferably by up to five amino acids, preferably by up to four amino acids, preferably by up to three amino acids, preferably by up to two amino acids, and preferably by one amino acid from the mature polypeptide of SEQ ID NO: 1.

An X143 polypeptide preferably comprises the amino acid sequence of SEQ ID NO: 1 or an allelic variant thereof; or a fragment thereof having a boosting effect on starch saccharification when used in combination with amylolytic enzymes such as alpha-amylases and glucoamylases.

In a preferred aspect, the X143 polypeptide comprises the amino acid sequence of SEQ ID NO: 1. In another preferred aspect, the polypeptide comprises the mature polypeptide of SEQ ID NO: 1. In another preferred aspect, the polypeptide comprises amino acids 19 to 248 of SEQ ID NO: 1, or an allelic variant thereof; or a fragment thereof.

In another preferred aspect, the polypeptide consists of the amino acid sequence of SEQ ID NO: 1 or an allelic variant thereof; or a fragment thereof having a boosting effect on starch saccharification when used in combination with amylolytic enzymes such as alpha-amylases and glucoamylases.

In another preferred aspect, the polypeptide consists of the amino acid sequence of SEQ ID NO: 1. In another preferred aspect, the polypeptide consists of the mature polypeptide of SEQ ID NO: 1. In another preferred aspect, the polypeptide consists of amino acids 19 to 248 of SEQ ID NO: 1 or an allelic variant thereof; or a fragment thereof. In another preferred aspect, the polypeptide consists of amino acids 19 to 248 of SEQ ID NO: 1.

The amino acid sequence of SEQ ID NO: 1; or a fragment thereof, may be used to design nucleic acid probes to identify and clone DNA encoding polypeptides having a boosting effect on starch saccharification when used in combination with amylolytic enzymes such as alpha-amylases and glucoamylases, from strains of different genera or species according to methods well known in the art. In particular, such probes can be used for hybridization with the genomic or cDNA of the genus or species of interest, following standard Southern blotting procedures, in order to identify and isolate the corresponding gene therein. Such probes can be considerably shorter than the entire sequence, but should be at least 14, preferably at least 25, more preferably at least 35, and most preferably at least 70 nucleotides in length. It is, however, preferred that the nucleic acid probe is at least 100 nucleotides in length. For example, the nucleic acid probe may be at least 200 nucleotides, preferably at least 300 nucleotides, more preferably at least 400 nucleotides, or most preferably at least 500 nucleotides in length. Even longer probes may be used, e.g., nucleic acid probes that are preferably at least 600 nucleotides, more preferably at least 700 nucleotides, even more preferably at least 800 nucleotides, or most preferably at least 900 nucleotides in length. Both DNA and RNA probes can be used. The probes are typically labeled for detecting the corresponding gene (for example, with $^{32}$P, $^{3}$H, $^{35}$S, biotin, or avidin). Such probes are encompassed by the present invention.

A genomic DNA or cDNA library prepared from such other strains may, therefore, be screened for DNA that hybridizes with the probes described above and encodes an X143 polypeptide. Genomic or other DNA from such other strains may be separated by agarose or polyacrylamide gel electrophoresis, or other separation techniques. DNA from the libraries or the separated DNA may be transferred to and immobilized on nitrocellulose or other suitable carrier material.

For purposes of the present invention, hybridization indicates that the nucleotide sequence hybridizes to a labeled nucleic acid probe corresponding to the mature polypeptide coding sequence of SEQ ID NO: 1.

For long probes of at least 100 nucleotides in length, very low to very high stringency conditions are defined as pre-hybridization and hybridization at 42° C. in 5×SSPE, 0.3% SDS, 200 µg/ml sheared and denatured salmon sperm DNA, and either 25% formamide for very low and low stringencies, 35% formamide for medium and medium-high stringencies, or 50% formamide for high and very high stringencies, following standard Southern blotting procedures for 12 to 24 hours optimally.

For long probes of at least 100 nucleotides in length, the carrier material is finally washed three times each for 15 minutes using 2×SSC, 0.2% SDS preferably at 45° C. (very low stringency), more preferably at 50° C. (low stringency), more preferably at 55° C. (medium stringency), more preferably at 60° C. (medium-high stringency), even more preferably at 65° C. (high stringency), and most preferably at 70° C. (very high stringency).

For short probes of about 15 nucleotides to about 70 nucleotides in length, stringency conditions are defined as pre-hybridization, hybridization, and washing post-hybridization at about 5° C. to about 10° C. below the calculated $T_m$ using the calculation according to Bolton and McCarthy (1962, *Proceedings of the National Academy of Sciences USA* 48:1390) in 0.9 M NaCl, 0.09 M Tris-HCl pH 7.6, 6 mM EDTA, 0.5% NP-40, 1×Denhardt's solution, 1 mM sodium pyrophosphate, 1 mM sodium monobasic phosphate, 0.1 mM ATP, and 0.2 mg of yeast RNA per ml following standard Southern blotting procedures for 12 to 24 hours optimally.

For short probes of about 15 nucleotides to about 70 nucleotides in length, the carrier material is washed once in 6×SCC plus 0.1% SDS for 15 minutes and twice each for 15 minutes using 6×SSC at 5° C. to 10° C. below the calculated $T_m$.

In another aspect, the X143 polypeptide having a boosting effect on starch saccharification when used in combination with amylolytic enzymes such as alpha-amylases and glucoamylases, comprises a substitution, deletion, and/or insertion of one or more (or several) amino acids of the mature polypeptide of SEQ ID NO: 1, or a homologous sequence thereof. Preferably, amino acid changes are of a minor nature, that is conservative amino acid substitutions or insertions that do not significantly affect the folding and/or activity of the protein; small deletions, typically of one to about 30 amino acids; small amino- or carboxyl-terminal extensions, such as an amino-terminal methionine residue; a small linker peptide of up to about 20-25 residues; or a small extension that facilitates purification by changing net charge or another function, such as a poly-histidine tract, an antigenic epitope or a binding domain.

Examples of conservative substitutions are within the group of basic amino acids (arginine, lysine and histidine), acidic amino acids (glutamic acid and aspartic acid), polar amino acids (glutamine and asparagine), hydrophobic amino acids (leucine, isoleucine and valine), aromatic amino acids (phenylalanine, tryptophan and tyrosine), and small amino acids (glycine, alanine, serine, threonine and methionine). Amino acid substitutions that do not generally alter specific activity are known in the art and are described, for example, by H. Neurath and R. L. Hill, 1979, In, The Proteins, Academic Press, New York. The most commonly occurring exchanges are Ala/Ser, Val/Ile, Asp/Glu, Thr/Ser, Ala/Gly, Ala/Thr, Ser/Asn, Ala/Val, Ser/Gly, Tyr/Phe, Ala/Pro, Lys/Arg, Asp/Asn, Leu/Ile, Leu/Val, Ala/Glu, and Asp/Gly.

Alternatively, the amino acid changes are of such a nature that the physico-chemical properties of the polypeptides are altered. For example, amino acid changes may improve the thermal stability of the polypeptide, alter the substrate specificity, change the pH optimum, and the like.

Essential amino acids in a parent polypeptide can be identified according to procedures known in the art, such as site-directed mutagenesis or alanine-scanning mutagenesis (Cunningham and Wells, 1989, *Science* 244: 1081-1085). In the latter technique, single alanine mutations are introduced at every residue in the molecule, and the resultant mutant molecules are tested for boosting effect on starch saccharification to identify amino acid residues that are critical to the activity of the molecule. See also, Hilton et al., 1996, *J. Biol. Chem.* 271: 4699-4708. The active site of the enzyme or other biological interaction can also be determined by physical analysis of structure, as determined by such techniques as nuclear magnetic resonance, crystallography, electron diffraction, or photoaffinity labeling, in conjunction with mutation of putative contact site amino acids. See, for example, de Vos et al., 1992, *Science* 255: 306-312; Smith et al., 1992, *J. Mol. Biol.* 224: 899-904; Wlodaver et al., 1992, *FEBS Lett.* 309: 59-64. The identities of essential amino acids can also be inferred from analysis of identities with polypeptides that are related to the parent polypeptide.

Single or multiple amino acid substitutions, deletions, and/or insertions can be made and tested using known methods of mutagenesis, recombination, and/or shuffling, followed by a relevant screening procedure, such as those disclosed by Reidhaar-Olson and Sauer, 1988, *Science* 241: 53-57; Bowie and Sauer, 1989, *Proc. Natl. Acad. Sci. USA* 86: 2152-2156; WO 95/17413; or WO 95/22625. Other methods that can be used include error-prone PCR, phage display (e.g., Lowman et al., 1991, *Biochemistry* 30: 10832-10837; U.S. Pat. No. 5,223,409; WO 92/06204), and region-directed mutagenesis (Derbyshire et al., 1986, *Gene* 46: 145; Ner et al., 1988, *DNA* 7: 127).

Mutagenesis/shuffling methods can be combined with high-throughput, automated screening methods to detect activity of cloned, mutagenized polypeptides expressed by host cells (Ness et al., 1999, *Nature Biotechnology* 17: 893-896). Mutagenized DNA molecules that encode active polypeptides can be recovered from the host cells and rapidly sequenced using standard methods in the art. These methods allow the rapid determination of the importance of individual amino acid residues in a polypeptide.

The total number of amino acid substitutions, deletions and/or insertions of the mature polypeptide of SEQ ID NO: 1, is not more than 10, e.g., 1, 2, 3, 4, 5, 6, 7, 8 or 9.

An X143 polypeptide having a boosting effect on starch saccharification when used in combination with amylolytic enzymes such as alpha-amylases and glucoamylases, may be obtained from *Aspergillus*, in particular *Aspergillus terreus* and *Aspergillus nidulans*; especially *Aspergillus terreus* (strain NIH 2624).

Strains of this species are readily accessible to the public in a number of culture collections, such as the American Type Culture Collection (ATCC), Deutsche Sammlung von Mikroorganismen and Zellkulturen GmbH (DSM), Centraalbureau Voor Schimmelcultures (CBS), and Agricultural Research Service Patent Culture Collection, Northern Regional Research Center (NRRL).

In another more preferred aspect, the X143 polypeptide is an *Aspergillus terreus* polypeptide having a boosting effect on starch saccharification when used in combination with amylolytic enzymes such as alpha-amylases and glucoamylases, e.g., the polypeptide comprising the mature polypeptide of SEQ ID NO: 1.

Compositions Comprising a Lipolytic Enzyme and/or a Xylanase and an X143 Polypeptide The present invention relates to compositions comprising a lipolytic enzyme and/or a xylanase and an X143 polypeptide, and their preparation, e.g., compositions suitable for increasing the loaf volume of a baked product.

The composition may further comprise one or more additional enzymes, in particular amylase, glucanase, galactanase, mannanase, aminopeptidase, alpha-amylase, beta-amylase, anti-staling alpha-amylase, carboxypeptidase, catalase, chitinase, cutinase, cyclodextrin glycosyltransferase, deoxyribonuclease, esterase, alpha-galactosidase, beta-galactosidase, glucoamylase, alpha-glucosidase, beta-glucosidase, haloperoxidase, invertase, laccase, mannosidase, oxidase, pectinolytic enzymes, peptidoglutaminase, protease, peroxidase, phytase, and polyphenoloxidase.

The compositions may be prepared in accordance with methods known in the art and may have any physical appearance such as liquid, paste or solid. For instance, the composition may be formulated using methods known to the art of formulating enzymes and/or pharmaceutical products, e.g., into coated or uncoated granules or micro-granules. The lipolytic enzyme, and/or the xylanase, and the X143 polypeptide, and any additional enzymes to be included in the composition may be stabilized in accordance with methods known in the art, e.g., by stabilizing the polypeptide in the composition by adding an antioxidant or reducing agent to limit oxidation of the polypeptide or it may be stabilized by adding polymers such as PVP, PVA, PEG, or other suitable polymers known to be beneficial to the stability of polypeptides in solid or liquid compositions.

When formulating the lipolytic enzyme, and/or the xylanase, and the X143 polypeptide as a granulate or agglomerated powder, the particles preferably have a narrow particle size distribution with more than 95% (by weight) of the particles in the range from 25 to 500 µm. Granulates and agglomerated powders may be prepared by conventional methods, e.g., by spraying the lipolytic enzyme and/or the xylanase and the X143 polypeptide onto a carrier in a fluid-bed granulator. The carrier may consist of particulate cores having a suitable particle size. The carrier may be soluble or insoluble, e.g., a salt (such as NaCl or sodium sulfate), a sugar (such as sucrose or lactose), a sugar alcohol (such as sorbitol), starch, rice, corn grits, or soy. The composition is preferably in the form of a dry powder or granulates, in particular a non-dusting granulate.

In one embodiment, the invention provides a granule comprising a lipolytic enzyme, and/or a xylanase, and an X143 polypeptide.

In a particular embodiment, the composition is a dough composition or a dough improving additive or a premix comprising a lipolytic enzyme, and/or a xylanase, and an X143 polypeptide.

The term "pre-mix" is defined herein to be understood in its conventional meaning, i.e., as a mix of baking agents, generally including flour, which may be used in industrial bread-baking plants, in retail bakeries, in baking mixes for home use etc.

The pre-mix may be prepared by mixing the baking composition of the invention with a suitable carrier such as flour, starch, a sugar, a complex carbohydrate such as maltodextrin, or a salt. The pre-mix may contain other dough and/or bread additives, e.g., any of the additives, including enzymes, mentioned herein.

The Additional Enzymes

Optionally, additional enzymes, such as amylase, glucanase, galactanase, mannanase, aminopeptidase, alpha-amylase, beta-amylase, anti-staling alpha-amylase, carboxypeptidase, catalase, chitinase, cutinase, cyclodextrin glycosyltransferase, deoxyribonuclease, esterase, alpha-galactosidase, beta-galactosidase, glucoamylase, alpha-glucosidase, beta-glucosidase, haloperoxidase, invertase, laccase, mannosidase, oxidase, pectinolytic enzymes, peptidoglutaminase, protease, peroxidase, phytase, and polyphenoloxidase may be used together with the lipolytic enzyme and/or the xylanase and an X143 polypeptide. The additional enzyme may be of any origin, including mammalian and plant, and preferably of microbial (bacterial, yeast or fungal) origin.

The amylase may be fungal or bacterial, e.g., a maltogenic alpha-amylase from *B. stearothermophilus* or an alpha-amylase from *Bacillus*, e.g., *B. licheniformis* or *B. amyloliquefaciens*, a beta-amylase, e.g., from plant (e.g., soy bean) or from microbial sources (e.g., *Bacillus*), a glucoamylase, e.g., from *A. niger*, or a fungal alpha-amylase, e.g., from *A. oryzae*.

Suitable commercial maltogenic alpha-amylases include NOVAMYL™ and OPTICAKE™ (available from Novozymes NS); in particular Novamyl 500 BG™, Novamyl 10 000 BG™ Novamyl L™, Novamyl Sweet™, Novamyl 3D™, Opticake 50 BG™ and Opticake Fresh BG™.

Suitable commercial fungal alpha-amylase compositions include, e.g., BAKEZYME P 300 (available from DSM) and FUNGAMYL 2500 SG™, FUNGAMYL 4000 BG™, FUNGAMYL 800 L™, FUNGAMYL ULTRA BG™, FUNGAMYL ULTRA SG™, Fungamyl Super MA™, and Panzea Dual™ (available from Novozymes NS).

The glucose oxidase may be a fungal glucose oxidase, in particular an *Aspergillus niger* glucose oxidase (such as Gluzyme™ and Gluzyme Mono™ available from Novozymes NS, Denmark).

The protease may be from *Bacillus*, e.g., *B. amyloliquefaciens*.

Dough

In one aspect, the invention discloses a method for preparing dough or a baked product prepared from the dough which method comprises incorporating into the dough a lipolytic enzyme and/or a xylanase and an X143 polypeptide.

In another aspect, the invention provides dough comprising flour, water, and an effective amount of a baking composition or a premix according to the invention.

The present invention also relates to methods for preparing a dough or a baked product comprising incorporating into the dough an effective amount of a baking composition of the present invention which improves one or more properties of the dough or the baked product obtained from the dough relative to a dough or a baked product in which the X143 polypeptide is not incorporated.

The phrase "incorporating into the dough" is defined herein as adding the baking composition according to the invention to the dough, to any ingredient from which the dough is to be made, and/or to any mixture of dough ingredients from which the dough is to be made. In other words, the baking composition of the invention may be added in any step of the dough preparation and may be added in one, two or more steps. The composition is added to the other dough ingredients that is kneaded and baked to make the baked product, using methods well known in the art.

The term "effective amount" is defined herein as an amount of baking composition according to the invention that is sufficient for providing a measurable effect on at least one property of interest of the dough and/or baked product.

The term "dough" is defined herein as a mixture of flour and other ingredients firm enough to knead or roll.

The dough of the invention may comprise flour derived from any cereal grain, including wheat, barley, rye, oat, corn, sorghum, rice, and millet.

The dough may also comprise other conventional dough ingredients, e.g., proteins, such as milk powder, gluten, and soy; eggs (either whole eggs, egg yolks or egg whites); an oxidant such as ascorbic acid, potassium bromate, potassium iodate, azodicarbonamide (ADA) or ammonium persulfate; an amino acid such as L-cysteine; a sugar; a salt such as sodium chloride, calcium acetate, sodium sulfate or calcium sulfate; an oil; shortening; fat; and calcium propionate.

The dough may comprise one or more emulsifiers selected from the group consisting of diacetyl tartaric acid esters of monoglycerides (DATEM), sodium stearoyl lactylate (SSL), calcium stearoyl lactylate (CSL), ethoxylated mono- and diglycerides (EMG), polysorbates (PS), succinylated monoglycerides (SMG), monoacylglyceroles (MAG), diacylglyceroles (DAG), and mixtures thereof.

The dough of the invention may be fresh, frozen or par-baked (pre-baked).

The dough of the invention is normally leavened dough or dough to be subjected to leavening. The dough may be leavened in various ways, such as by adding chemical leavening agents, e.g., sodium bicarbonate or by adding a leaven (fermenting dough), but it is preferred to leaven the dough by adding a suitable yeast culture, such as a culture of *Saccharomyces cerevisiae* (baker's yeast), e.g., a commercially available strain of *S. cerevisiae*.

The amount of lipolytic enzyme in the dough may be between 0.01-100 mg enzyme per kg flour in the dough, in particular 0.05-50 mg enzyme per kg flour, in particular 0.05-10 mg enzyme per kg flour, in particular 0.05-1.0 mg enzyme per kg flour in the dough.

The amount of xylanase in the dough may be between 0.01-100 mg enzyme per kg flour in the dough, in particular 0.05-50 mg enzyme per kg flour.

The amount of X143 polypeptide in the dough may be between 0.01-100 mg polypeptide per kg flour in the dough, in particular 0.05-50 mg polypeptide per kg flour, in particular 0.05-10 mg polypeptide per kg flour, in particular 0.05-5.0 mg polypeptide per kg flour in the dough.

The amount of emulsifier in the dough may be between 0.01% (w/w) and 0.5% (w/w). Preferably, the amount of emulsifier in the dough is between 0.05% and 0.2%, such as around 0.1%.

Baked Product

The process of the invention may be used for any kind of baked product prepared from dough, either of a soft or a crisp character, either of a white, light or dark type. As used herein, "baked product" means any kind of baked product (in particular white, whole-meal or rye bread), including bread types such as pan bread, toast bread, open bread, pan bread with and without lid, buns, hamburger buns, rolls, baguettes, brown bread, whole meal bread, rich bread, bran bread, flat bread, tortilla, pita, Arabic bread, Indian flat bread, steamed bread, pizza, and any variety thereof.

The present invention is further described by the following examples that should not be construed as limiting the scope of the invention.

Lipolytic Activity (LU)

The lipolytic activity may be determined using tributyrine as substrate. This method is based on the hydrolysis of tributyrin by the enzyme, and the alkali consumption to keep pH constant during hydrolysis is registered as a function of time.

One Lipase Unit (LU) is defined as the amount of enzyme which, under standard conditions (i.e. at 30° C.; pH 7.0; with 0.1% w/v Gum Arabic as emulsifier and 0.16 M tributyrine as substrate) liberates 1 micro mole titrable butyric acid per minute.

Phospholipase Activity (LEU)

In the LEU assay, the phospholipase activity is determined from the ability to hydrolyze lecithin at pH 8.0, 40° C. The hydrolysis reaction can be followed by titration with NaOH for a reaction time of 2 minutes. The phospholipase from porcine pancreas has an activity of 510 LEU/mg (taken as standard), and the phospholipase from *Fusarium oxysporum* (Lipopan F) has an activity of 1540 LEU/mg.

Xylanase Activity

For the purposes of the present invention any of the commercially available xylanase activity measurement kits is suitable to determine xylanase activity.

Measurement of X143 Polypeptide Boosting Effect

An X143 polypeptide may be evaluated for its ability to enhance the hydrolysis of corn starch by an amyloglucosidase. Hydrolysis of corn starch is conducted with 50 g of corn starch (Sigma Chemical Co., St. Louis, Mo., USA) per liter of 1.75 mM $CaCl_2$-50 mM sodium citrate pH 5.0, and 0.25-0.5 mM (30-60 ppm) of L-cysteine. An amyloglucosidase is added at 2.0 mg per liter final protein concentration. The hydrolytic reactions are incubated at room temperature overnight with or without 10 mg of an X143 polypeptide per liter. For each reaction, a single reaction mixture of 800 µl is prepared and then aliquoted in triplicate at 200 µl per well in an AXYGEN® 1 ml deep well plate. Glucose standards at 1000, 500, 250, 125, 62.5 and 0 mg per liter of 50 mM sodium citrate pH 5.0 buffer are added in duplicate at 200 µl per well. The plate is then heat sealed using an ALPS-300 plate sealer and left overnight at room temperature.

After overnight incubation, the plate is assayed for glucose using a glucose oxidase assay. One hundred microliters of 0.5 M NaOH are added to each well of the plate (including glucose standards) to stop the reactions. Then 20 µl from each well are transferred to a clear, flat-bottom 96-well plate containing 200 µl per well liquid glucose oxidase reagent (Pointe Scientific, Canton, Mich., USA, #G7521, lot #815601-182) and incubated for 7 minutes at room temperature. The absorbance at 490 nm is then measured using a SPECTRAMAX® 340pc spectrophotometric plate reader. Glucose concentration is determined from a straight-line fit to the concentration of glucose versus the absorbance at 490 nm for the glucose standards.

Example 1

Using an X143 Polypeptide in Baking

Bread was baked according to the straight dough method with normal and extended proofing using the following recipe and process.

Recipe:

| Ingredient: | amount (w/w on flour basis): |
|---|---|
| Ascorbic acid | 40 ppm |
| L-cystein | 30 ppm |
| Yeast | 4% |
| Salt | 1.5% |

-continued

| Ingredient: | amount (w/w on flour basis): |
|---|---|
| Sucrose | 1.5% |
| Water | 58% (to be optimized for each flour) |
| Wheat flour (Kolibri Meneba, NL) | 100% |

+enzymes according to Table 1

TABLE 1

| Dosages (on flour basis) | | | | | |
|---|---|---|---|---|---|
| Dough | 1 | 2 | 3 | 4 | 5 |
| Lipopan Xtra (mg EP/kg) | | 0.5 | 0.5 | | |
| Panzea (ppm) | | | | 20 | 20 |
| X143 (mg EP/kg) (SEQ ID NO: 1) | | | 1 | | 1 |

Procedure for Making the Breads:

Salt, sucrose, yeast, ascorbic acid, and the polypeptides (Lipopan Xtra, Panzea, X143) were added into a mixer bowl.

The temperature was adjusted (to give a dough temperature of 26° C. after mixing).

Water was scaled and added into the mixer bowl.

Flour was added.

The ingredients were mixed for 3 min at 63 rpm and 6 min at 90 rpm using a spiral mixer. (SPK8, Diosna, DE).

The dough was taken from the mixer bowl, and the temperature was determined to secure that each dough had the same temperature (dough temperatures may vary 1° C. between different doughs). The dough parameters were determined (dough evaluation after mixing), and the dough was molded on the molder (CR59, Werner & Pfleiderer, NL).

The dough was given 20 min bench-time at room temperature (21° C.) under plastic cover, and the second dough evaluation was performed (dough parameters after bench-time). The dough was scaled (350 g/bread) and molded thereafter.

The molded dough was given 15 minutes bench time covered in plastic.

The dough for bread was shaped in a sheeter (M0671 MPB-001, Glimek, SE). The sheeted doughs were transferred to 1200 ml pans (Top 160×110×85 mm), which were put on baking sheet.

The doughs were proofed at 32° C., 86% relative humidity, for 55 min or 80 min.

The bread was baked in a deck oven (Infra, Wachtel, DE), for 35 min at 225° C. with steam (damper opens after 25 min in order to let out the steam from the oven).

The bread was taken out of the pans after baking and put on a baking sheet.

The bread was allowed to cool to room temperature.

The bread and rolls were evaluated regarding volume, external and internal bread evaluation.

Manual Dough Evaluation

The dough properties were evaluated directly after mixing and after 20 min bench time using the parameters, definitions, and evaluation methods as described in Table 2 below. A scale between 0-10 was used where the control dough (dough 1 without any enzyme additions) was given the score 5 and the other doughs with enzymes added were evaluated relative to the control. The further away from the control the dough was judged to be, the higher/lower score the dough was given.

TABLE 2

| Dough evaluation | | | |
|---|---|---|---|
| Parameters | Definition | Evaluation method | Scale |
| Stickiness | The degree to which a dough adheres to ones hands or other surfaces | A 3 cm deep cut is made in the middle of the dough. Stickiness is evaluated by touch of the fresh cut surface with the whole palm of the hand | Less sticky 0-4 Control 5 More sticky 6-10 |
| Softness | The degree to, or ease with, which a dough will compress or resist compression | Is measured by squeezing and feeling the dough | Less soft 0-4 Control 5 More soft 6-10 |
| Elasticity | The ability of a dough to resist stretching as well as to return to its original size and shape when the force is removed | A dough ball (~30 g) is rolled to a dough string of 10 cm, which is pulled gently in each end to feel the resistance/the elasticity. | Less elastic 0-4 Control 5 More elastic 6-10 |
| Extensibility | The degree to which a dough can be stretched without tearing | A dough ball (~30 g) is gently stretched to form a "window" to feel the extensibility | Less extensible 0-4 Control 5 More extensible 6-10 |

Volume Determination

The specific volume was measured using the Volscan profiler 600 (Stable microsystems, UK) running on the Volscan profiler software.

Each bread was mounted in the machine.

The weight of each loaf was automatically determined with the built-in balance of the Volscan instrument.

The volume of each loaf was calculated from the 3D image created by the instrument when each loaf of bread was rotated with a speed of 1.5 rps (revolution per second) while it was scanned with a laser beam taking 3 mm vertical steps each revolution.

The output of the instrument was weight (g) and volume (ml) for each bread. From the weight and volume the specific volume was calculated for each bread according to Equation 1 and the specific volume index was calculated according to Equation 2. The reported value is the average of 2 breads from the same dough.

Specific volume (ml/g)=volume (in ml)/weight (in g)   Equation 1

Specific volume index (%)=Specific volume of Bread with enzyme (in ml/g)/Specific volume of Bread without enzyme (in ml/g)*100   Equation 2

Results
Dough Properties

TABLE 3

Dough properties after mixing

|  | Control | Panzea 20 ppm | Panzea 20 ppm + X143 1 mgEP/kg | Lipopan Xtra 0.5 mgEP/kg | Lipopan Xtra 0.5 mgEP/kg + X143 1 mgEP/kg |
|---|---|---|---|---|---|
| Stickiness | 5 | 6 | 5 | 6 | 5 |
| Softness | 5 | 6 | 5 | 6 | 5 |
| Extensibility | 5 | 5 | 5 | 5 | 5 |
| Elasticity | 5 | 5 | 5 | 5 | 5 |

TABLE 4

Dough properties after 20 min bench time

|  | Control | Panzea 20 ppm | Panzea 20 ppm + X143 1 mgEP/kg | Lipopan Xtra 0.5 mgEP/kg | Lipopan Xtra 0.5 mgEP/kg + X143 1 mgEP/kg |
|---|---|---|---|---|---|
| Stickiness | 5 | 6 | 5 | 6 | 5 |
| Softness | 5 | 6 | 5 | 6 | 5 |
| Extensibility | 5 | 5 | 5 | 5 | 5 |
| Elasticity | 5 | 5 | 5 | 5 | 5 |

Bread volume

TABLE 5

Volume and specific volume of bread proofed for 55 min

|  | Control | Panzea 20 ppm | Panzea 20 ppm + X143 1 mgEP/kg | Lipopan Xtra 0.5 mgEP/kg | Lipopan Xtra 0.5 mgEP/kg + X143 1 mgEP/kg |
|---|---|---|---|---|---|
| Specific volume in ml/g | 3.59 | 3.72 | 3.74 | 4.14 | 4.18 |
| Specific volume index % | 100 | 104 | 104 | 115 | 116 |

TABLE 6

Volume and specific volume of bread proofed for 80 min

|  | Control | Panzea 20 ppm | Panzea 20 ppm + X143 1 mgEP/kg | Lipopan Xtra 0.5 mgEP/kg | Lipopan Xtra 0.5 mgEP/kg + X143 1 mgEP/kg |
|---|---|---|---|---|---|
| Specific volume in ml/g | 4.00 | 4.20 | 4.38 | 4.76 | 4.82 |
| Specific volume index % | 100 | 105 | 110 | 119 | 121 |

CONCLUSION

Panzea+/−X143:

When 20 ppm Panzea was added to the bread dough, the stickiness and softness increased from a dough evaluation score of 5 to 6.

If 1 mg EP/kg flour of the polypeptide X143 was added together with 20 ppm Panzea, the stickiness and softness score remained at a dough evaluation score of 5 as can be seen in Table 3 and Table 4.

This stickiness and softness reduction effect of X143 was seen without influencing any other properties of the bread such as bread volume (Table 5 and Table 6) or other bread properties (such as crust color, crispiness, cell size, cell wall, cell form, crumb color).

Lipopan Xtra+/−X143:

When 0.5 mg EP/kg flour Lipopan Xtra was added to bread dough, the stickiness and softness increased from a dough evaluation score of 5 to 6. If 1 mg EP/kg flour of the polypeptide X143 was added together with 0.5 mg EP/kg flour, the stickiness and softness score remained at a dough evaluation score of 5 as can be seen in Table 3 and Table 4.

This stickiness and softness reduction effect of X143 was seen without influencing any other properties of the bread such as bread volume (Table 5 and Table 6) or other bread properties (such as crust color, crispiness, cell size, cell wall, cell form, crumb color).

The invention claimed is:

1. A method for preparing a dough or a baked product prepared from the dough which method comprises incorporating into the dough a lipolytic enzyme and/or a xylanase and a monooxygenase family AA13, wherein the monooxygenase family AA13 has at least 95% sequence identity to the mature polypeptide of SEQ ID NO: 1, and wherein the mature protein is amino acids 19 to 248 of SEQ ID NO: 1 and further wherein the stickiness of the dough is reduced compared to dough without the monooxygenase family AA13.

2. The method according to claim 1, wherein the lipolytic enzyme is a lipase, a phospholipase and/or a galactolipase.

3. The method according to claim 1, wherein the monooxygenase family AA13 is the mature polypeptide of SEQ ID NO: 1, wherein the mature protein is amino acids 19 to 248 of SEQ ID NO: 1.

4. The method according to claim 1, which further comprises adding to the dough an enzyme selected from the group consisting of amylase, glucanase, galactanase, mannanase, aminopeptidase, alpha-amylase, beta-amylase, antistaling alpha-amylase, carboxypeptidase, catalase, chitinase, cutinase, cyclodextrin glycosyltransferase, deoxyribonuclease, esterase, alpha-galactosidase, beta-galactosidase, glucoamylase, alpha-glucosidase, beta-glucosidase, haloperoxidase, invertase, laccase, mannosidase, oxidase, pectinolytic enzymes, peptidoglutaminase, protease, peroxidase, phytase, and polyphenoloxidase.

5. The method according to claim 1, wherein the lipolytic enzyme is applied in an amount of 0.01-100 mg enzyme per kg flour.

6. The method according to claim 1, wherein the xylanase is applied in an amount of 0.01-100 mg enzyme per kg flour.

7. The method according to claim 1, wherein the monooxygenase family AA13 is applied in an amount of 0.01-100 mg polypeptide per kg flour.

8. A pre-mix comprising a baking composition comprising a lipolytic enzyme and/or a xylanase and monooxygenase family AA13, and further comprising flour, and one or more dough or bread additives.

9. A dough comprising flour, water and an effective amount of a baking composition or a pre-mix comprising a lipolytic enzyme and/or a xylanase and a monooxygenase family AA13, wherein the monooxygenase family AA13 has at least 95% sequence identity to the mature polypeptide of SEQ ID NO: 1, and wherein the mature protein is amino acids 19 to 248 of SEQ ID NO: 1 and further wherein the stickiness of the dough is reduced compared to dough without the monooxygenase family AA13.

10. A baked product obtained by baking the dough according to claim 9.

11. The dough of claim 9, wherein the lipolytic enzyme is a lipase, a phospholipase and/or a galactolipase.

12. The dough of claim 9, wherein the monooxygenase family AA13 is the mature polypeptide of SEQ ID NO: 1, wherein the mature protein is amino acids 19 to 248 of SEQ ID NO: 1.

13. The dough of claim 9, which further comprises adding an enzyme selected from the group consisting of amylase, glucanase, galactanase, mannanase, aminopeptidase, alpha-amylase, beta-amylase, anti-staling alpha-amylase, carboxypeptidase, catalase, chitinase, cutinase, cyclodextrin glycosyltransferase, deoxyribonuclease, esterase, alpha-galactosidase, beta-galactosidase, glucoamylase, alpha-glucosidase, beta-glucosidase, haloperoxidase, invertase, laccase, mannosidase, oxidase, pectinolytic enzymes, peptidoglutaminase, protease, peroxidase, phytase, and polyphenoloxidase.

14. The dough of claim 9, wherein the lipolytic enzyme is applied in an amount of 0.01-100 mg enzyme per kg flour.

15. The dough of claim 9, wherein the xylanase is applied in an amount of 0.01-100 mg enzyme per kg flour.

16. The dough of claim 9, wherein the monooxygenase family AA13 is applied in an amount of 0.01-100 mg polypeptide per kg flour.

* * * * *

SEQUENCE LISTING

<160> NUMBER OF SEQ ID NOS: 1

<210> SEQ ID NO 1
<211> LENGTH: 248
<212> TYPE: PRT
<213> ORGANISM: Aspergillus terreus

<400> SEQUENCE: 1

-continued

```
Met Lys Gly Val Ala Ala Leu Ile Ser Leu Ser Met Val Thr Cys Val
1               5                   10                  15

Ala Gly His Gly Tyr Met Trp Ser Pro Met Ser Arg Thr Arg Ile Gly
            20                  25                  30

Ala Glu Ser Gly Asn Asp Thr Cys Pro Glu Cys Thr Ile Leu Glu Pro
            35                  40                  45

Val Thr Ala Trp Pro Thr Leu Asp Glu Ala Lys Val Gly Arg Ser Gly
        50                  55                  60

Val Cys Gly Tyr Asn Ala Arg Val Ser Thr Asp Tyr Asn Val Pro Ala
65                  70                  75                  80

Gly Asp Trp Gly Ala Asp Val Val Lys Thr Tyr Ser Pro Gly Glu Glu
            85                  90                  95

Ile Glu Val Val Trp Cys Val Asp His Asn Gly Asp His Gly Gly Met
            100                 105                 110

Phe Thr Tyr Arg Ile Cys Gln Asp Gln Thr Ile Val Asp Lys Phe Leu
            115                 120                 125

Asp Pro Ser His Thr Pro Thr Glu Glu Lys Gln Ala Ala Glu Asp
        130                 135                 140

Cys Phe Gln Lys Gly Val Leu Pro Cys Thr Asp Val Asn Gly Gln Glu
145                 150                 155                 160

Cys Asn Tyr Ser Pro Asp Cys Ser Glu Gly Glu Ala Cys Trp Arg Lys
                165                 170                 175

Asp Trp Phe Thr Cys Asn Gly Phe Asp Asp Thr Lys Cys Gln Gly Val
            180                 185                 190

Asp Asn Ala Glu Leu Asn Ser Cys Tyr Thr Ser Ile Ala Gly Gly Tyr
            195                 200                 205

Thr Val Thr Lys Lys Val Lys Leu Pro Asp Tyr Thr Ser Lys His Thr
        210                 215                 220

Leu Leu Ser Phe Lys Trp Asn Ser Tyr Gln Thr Pro Gln Ile Tyr Leu
225                 230                 235                 240

Ser Cys Ala Asp Ile Ala Ile Gln
                245
```